(12) United States Patent
Pugel

(10) Patent No.: US 8,902,369 B2
(45) Date of Patent: Dec. 2, 2014

(54) MULTICHANNEL DIGITAL CABLE TUNER

(75) Inventor: Michael Anthony Pugel, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1163 days.

(21) Appl. No.: 12/227,673

(22) PCT Filed: Jun. 16, 2006

(86) PCT No.: PCT/US2006/023664
§ 371 (c)(1),
(2), (4) Date: Nov. 24, 2008

(87) PCT Pub. No.: WO2007/145637
PCT Pub. Date: Dec. 21, 2007

(65) Prior Publication Data
US 2009/0174822 A1   Jul. 9, 2009

(51) Int. Cl.
*H04N 5/50* (2006.01)
*H04N 5/44* (2011.01)
*H04N 5/46* (2006.01)

(52) U.S. Cl.
CPC ............... *H04N 5/4401* (2013.01); *H04N 5/46* (2013.01)
USPC ............................ 348/731; 348/554; 348/725

(58) Field of Classification Search
USPC ......... 348/725–726, 553–555, 558, 584, 731; 375/316, 260, 219, 267; 725/151–153, 725/131, 139
IPC ....................................................... H04N 5/50
See application file for complete search history.

(56) References Cited

U.S. PATENT DOCUMENTS 5,068,918 A   11/1991   Verheijen et al.
5,727,060 A   3/1998   Young
5,745,846 A   4/1998   Myer et al.
(Continued)

FOREIGN PATENT DOCUMENTS

CA   2034233   7/1991
CA   2106828   4/1994
(Continued)

OTHER PUBLICATIONS

International Search Report dated Feb. 26, 2007.
(Continued)

*Primary Examiner* — Trang U Tran
(74) *Attorney, Agent, or Firm* — Robert D. Shedd; Kuniyuki Akiyama

(57) ABSTRACT

A method and apparatus is presented for simultaneous reception of a plurality of digital RF channels. Specifically, N amplifier-filter circuits are configured to receive and separate a multichannel analog RF input signal into N analog signals, each including a different frequency band. N analog-to-digital converters are provided, each respectively coupled to one of the N amplifier-filter circuits and configured to receive an analog signal and generate a respective digital signal. A digital tuner is coupled to receive and demultiplex the N digital signals generated by the N analog-to-digital converters thereby recovering M digital RF channels. M demodulation circuits are provided for performing demodulation and forward-error-correction of the M digital RF channels (see FIG. 1). This combination of components permits substantially simultaneous reception of multiple digital cable channels within a single digital receiver circuit suitable for use with conventional cable delivery systems and at a reasonable cost.

4 Claims, 4 Drawing Sheets

(56) References Cited

U.S. PATENT DOCUMENTS

| | | | |
|---|---|---|---|
| 6,611,569 B1 * | 8/2003 | Schier et al. | 375/322 |
| 7,401,349 B2 * | 7/2008 | Knutson et al. | 725/64 |
| 7,623,580 B2 * | 11/2009 | McNaught-Davis Hess et al. | 375/260 |
| 2003/0056221 A1 | 3/2003 | Zhang et al. | |
| 2004/0204034 A1 | 10/2004 | Hanrahan | |
| 2005/0012869 A1 | 1/2005 | Akiyama | |
| 2005/0190777 A1 | 9/2005 | Hess et al. | |

FOREIGN PATENT DOCUMENTS

| | | |
|---|---|---|
| CA | 2161732 | 5/1996 |
| GB | 2396496 | 8/2004 |
| JP | 4373288 | 12/1992 |
| JP | 135223 | 5/1997 |
| JP | 9135223 | 5/1997 |
| JP | 9247560 | 9/1997 |
| JP | 2000324003 | 11/2000 |
| JP | 2003/125302 | 4/2003 |
| JP | 2003125302 | 4/2003 |
| JP | 2003289451 | 10/2003 |
| JP | 2005/504468 | 2/2005 |
| JP | 2005/123734 | 5/2005 |
| JP | 2005252325 | 9/2005 |
| JP | 2008511204 | 4/2008 |
| WO | WO9208320 | 5/1992 |
| WO | WO9417630 | 8/1994 |
| WO | WO0120792 | 3/2001 |
| WO | WO03026242 | 3/2003 |
| WO | WO 03/073663 | 9/2003 |
| WO | WO2006023049 | 3/2006 |

OTHER PUBLICATIONS

Choi et al., "An Adaptive System for Direct Blind Multi-Channel Equalization," IEEE Signal Processing Workshop on Signal Processing Advances in Wireless Communications, Apr. 16-18, 1997, pp. 85-88.

SIPO Search Report dated Apr. 21, 2014.

SIPO Search Report dated Apr. 21, 2014 (In English).

* cited by examiner

MULTICHANNEL DIGITAL CABLE TUNER

This application claims the benefit, under 35 U.S.C. §365 of International Application PCT/US2006/023664 filed Jun. 16, 2006, which was published in accordance with PCT Article 21(2) on Dec. 21, 2007 in English.

FIELD OF THE INVENTION

The present invention relates to television communications and, in particular, to an apparatus and method for multichannel television reception.

BACKGROUND OF THE INVENTION

In order to accommodate the increasing demands of television consumers, cable television (cable TV or CATV) broadcasters have transformed themselves in recent years to provide digital (as opposed to traditional analog) channels among their broadcast content. Cable TV broadcasters have employed digital technology to, for example, increase the number of offered channels, add per-channel programming information, and provide remote-interaction functionality such as pay-per-view (PPV) movies and sporting events.

As the benefits of digital cable television have become known, consumer demand has continued to rise, along with demand for increased variety of content. This demand for increased variety has reached the end-user level, where several users within a single household may prefer to enjoy different cable television programs simultaneously. Because digital cable television receivers, or set top boxes (STBs), were previously designed to receive only a single channel at a time, multiple simultaneous channel reception presented a problem for multi-user households.

Traditional solutions to this problem have included the provision of several receivers or STBs, each located in different rooms of the household. In this way, each television reception device, for example a television set, could be coupled to its own STB, and each user could independently receive and control reception of different cable television programs. These traditional solutions suffered from several disadvantages including increased cost of acquiring a plurality of STBs, increased space requirements for the additional STBs, need for additional household coaxial cable wiring, etc.

In addition to the above-mentioned disadvantages, traditional solutions lack the flexibility required to keep pace with new developments in consumer demand and diversification of that demand. For example, consumers now demand support for simultaneous reception and display of multiple television channels on a single television screen (e.g., picture-in-picture (PiP)). In addition, the emergence of personal video recorder (PVR) technology increases the demand for multi-channel reception capability. Many PVR's include the ability to tune one or more channels for viewing, while simultaneously tuning one or more additional channels for recording to a recording medium. The information on the recorded channels is then available for later playback or other processing.

Along with the ability to simultaneously tune multiple channels it would be advantageous for tuning equipment to include a networking functionality that would allow distribution of received content to various locations, such as various rooms within a residence. It would therefore be desirable to have a distribution network coupled to a multichannel tuner device. Furthermore, it would be advantageous if such a distribution network included a networking device that was integral to a tuner system, thus simplifying setup and maintenance of a network for the redistribution of cable channel content.

Consumers have begun to demand additional flexibility in the location of reception devices, including handheld personal media devices capable of remotely receiving digital television programs as well as digital music programs, without the increased cost of a plurality of STBs.

SUMMARY OF THE INVENTION

Given consumer demand for increased flexibility and convenience, there is a need for a digital television receiver capable of simultaneously receiving a plurality of channels, designed for delivery of a variety of digital content, and suitable for use with conventional cable television delivery systems.

The present invention is directed to a method and apparatus for simultaneous reception of a plurality of digital television channels. Specifically, the apparatus of the present invention is directed to a multichannel receiver circuit including a plurality of amplifier-filter circuits configured to receive a multichannel analog RF input signal, the plurality of amplifier-filter circuits including at least a first amplifier-filter circuit configured to generate a first analog signal including a first band of frequencies and a second amplifier-filter circuit configured to generate a second analog signal including a second band of frequencies. A plurality of analog-to-digital converters is provided, each respectively coupled to one of the plurality of amplifier-filter circuits, the plurality of analog-to-digital converters including at least a first analog-to-digital converter configured to receive the first analog signal and generate a first digital signal and a second analog-to-digital converter configured to receive the second analog signal and generate a second digital signal. A digital tuner is provided, coupled to receive at least the first and second digital signals generated by the plurality of analog-to-digital converters, the digital tuner configured to recover a plurality of digital RF channels.

In an alternate embodiment, in addition to the above a plurality of demodulator circuits is coupled to the digital tuner, the plurality of demodulator circuits including at least a first demodulator circuit configured to receive and demodulate a first channel of the plurality of digital RF channels and a second demodulator circuit being configured to receive and demodulate a second channel of the plurality of digital RF channels. The plurality of demodulator circuits includes circuitry configured for forward error correction.

The method of the present invention includes receiving at least one multichannel analog RF input signal; separating the multichannel analog RF input signal into at least two analog signals including a first analog signal including a first band of frequencies and a second analog signal including a second band of frequencies; converting the at least two analog signals into at least two respective digital signals, including converting the first analog signal into a first digital signal and converting the second analog signal into a second digital signal; and demultiplexing the at least two digital signals to recover the plurality of digital RF channels.

In an alternative embodiment, in addition to the above steps the method includes demodulating the plurality of digital RF channels, including at least demodulating a first digital RF channel and demodulating a second digital RF channel; and forward-error-correcting the plurality of digital RF channels, including at least performing a first forward-error-correction of the first digital RF channel and performing a second forward-error-correction of the second digital RF channel.

This combination of components, when employed in the configuration of the present invention, permits substantially simultaneous reception of a plurality of digital cable television channels within a single digital receiver circuit. These advantages can be provided in a form suitable for use with conventional cable television delivery systems and at a reasonable cost.

DETAILED DESCRIPTION

The following discussion of the method and apparatus directed to a multichannel receiver circuit will help illuminate the features and advantages of the present invention, including its ease of formation using conventional techniques of constructing electronic devices and circuits which are well known in the art.

In the following discussion, the singular term "signal" and plural term "signals" are used interchangeably and are to be understood as including analog or digital information, at a single frequency or a plurality of frequencies, and may or may not include coding, modulation, sideband information, or other features of signals or waveforms well known in the art. Furthermore, when reference is made to a "receiver," "transmitter," "output," or "input," previous process steps may have been utilized to form signals or waveforms compatible with these features.

In addition, no particular order is required for the method steps described below, with the exception of those logically requiring the results of prior steps, for example converting of the first and second analog signals into first and second digital signals logically requires the prior generation of first and second analog signals. Otherwise, enumerated steps are provided below in an exemplary order which may be altered. For instance, the several demodulation steps may be rearranged or performed simultaneously.

An exemplary embodiment of the invention will now be described with reference to FIG. 1. Although the invention will be described using the environment of reception of cable television signals, it should be apparent that the invention may be used in other types of radio-frequency communications systems as well, including reception of digital television channels via satellite and terrestrial television transmission systems. In contrast to the scheme described above, exemplary embodiments of the present invention provide substantially simultaneous recovery of a plurality of digital RF channels within a single multichannel receiver circuit, thereby reducing cost and increasing system flexibility.

Figure 1:
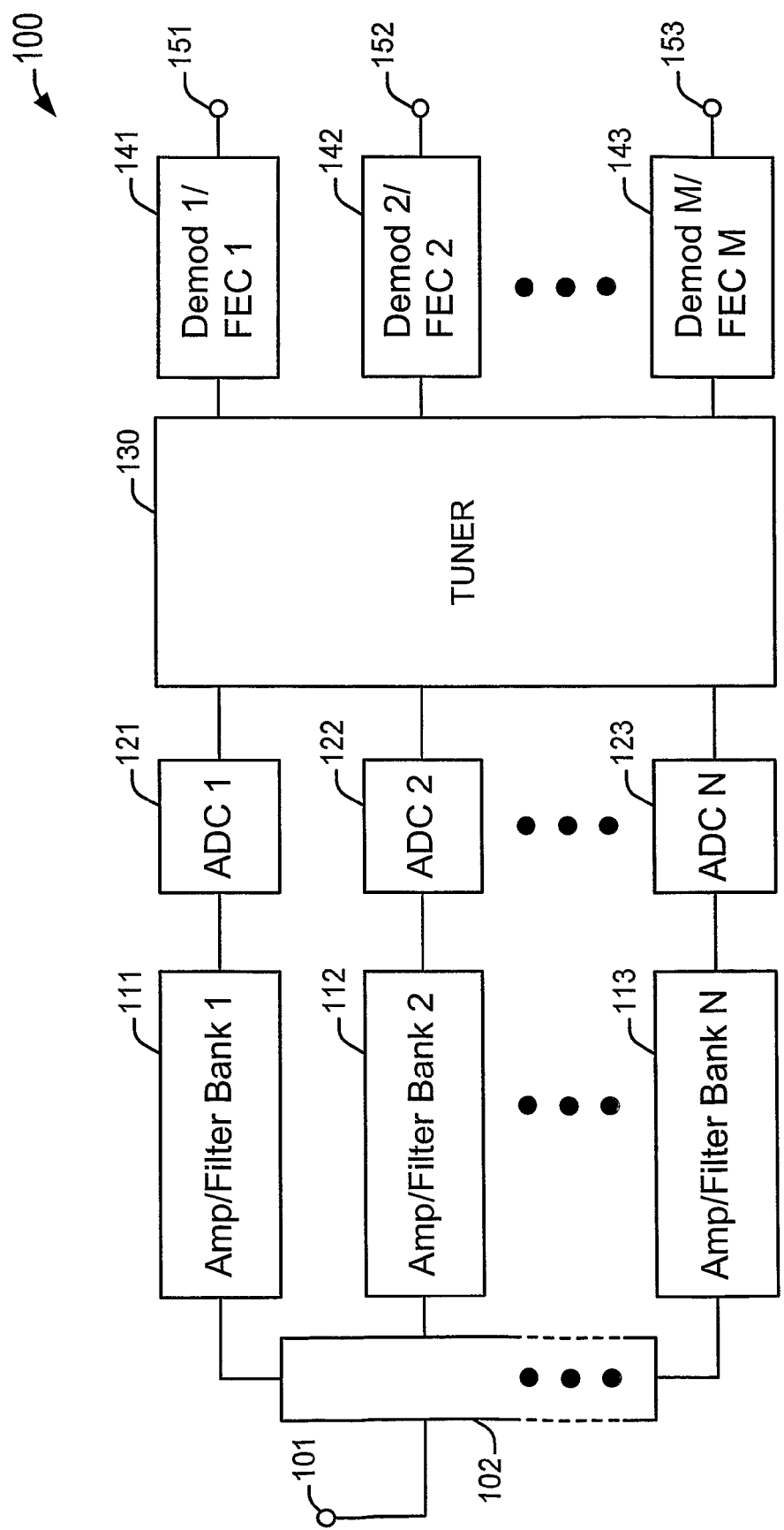
FIG. 1 is a simplified block diagram illustrating an exemplary multichannel receiver circuit in accordance with the present invention.

FIG. 1 shows a simplified block diagram representation of a multichannel receiver circuit generally designated 100 in accordance with an aspect of the present invention. The multichannel receiver circuit 100 includes a plurality of amplifier-filter banks or circuits 111, 112, 113, a plurality of analog-to-digital converters 121, 122, 123, a digital tuner 130, and a plurality of demodulator circuits 141, 142, 143. It should be apparent from FIG. 1 that, although three instances of each plurality are shown, the present invention is not so limited and any number of amplifier-filter circuits, analog-to-digital converters, and/or demodulator circuits may be used in accordance with the present invention. In addition, the number (1 . . . M) of demodulator circuits provided is not necessarily related to the number (1 . . . N) of amplifier-filter circuits and/or analog-to-digital converters provided, and accordingly the present invention should not be so limited.

In operation, according to one embodiment, a multichannel analog RF input signal received at input coupler 101 is split into a plurality of substantially identical signals at splitter 102. Splitter 102 may include one or more amplifiers, filters, or other components (not shown) which reduce or overcome insertion loss or other adverse effects of the split, as should be apparent to one of ordinary skill in the art. The plurality of amplifier-filter circuits 111, 112, 113 then segregates the multichannel analog input signal into a plurality of separate analog signals of differing frequency ranges, or "bands." Each separate analog signal is then converted from analog to digital form in an analog-to-digital converter 121, 122, 123.

It should be noted that, in one embodiment of the invention, the splitter 102 is omitted. In this embodiment, the respective inputs of the amplifier/filter banks 111, 112, 113 are mutually directly connected to the input coupler 101. The amplifier/filter banks 111, 112, 113 serve as a demultiplexer to demultiplex the incoming signal received at the input coupler 101. In one embodiment, each amplifier/filter bank has particular characteristics that permit the passage of a specific range of frequencies substantially independent of the frequency selection characteristics of the other amplifier/filter banks. For example, one filter might have a pass-band of about 5 to about 300 MHz, while another filter might have a pass band of about 300 to about 600 MHz.

In one embodiment, the band break edges would be passed through two amplifier sets, e.g., amplifier/filter banks 111, 112. Thus, for example, the channels present just above a distal 300 MHz would pass through both the 5 to 300 MHz filter and the 300 to 600 MHz filter. This helps to ensure the continuous coverage of all channel despite non-ideal filter characteristics.

The converted digital signals are coupled to the digital tuner 130, which demultiplexes the converted digital signals to generate a plurality of digital channel signals. Each digital channel signal is then coupled to a separate demodulator 141, 142, 143, which performs demodulation and forward-error-correction (FEC) operations appropriate for the content of that digital channel. Finally, in one embodiment, the resulting digital channel signals are each coupled to a separate output coupler 151, 152, 153 for further processing including for example MPEG transport processing.

Each of the plurality of amplifier-filter banks or circuits 111, 112, 113 is configured to process frequencies within a specified band. For example, a first amplifier-filter circuit 111 may be configured to process frequencies from about 5 MHz to about 300 MHz, a second amplifier-filter circuit 112 may be configured for frequencies between about 300 MHz and about 600 MHz, and a third amplifier-filter circuit 113 may be configured for frequencies from about 600 MHz to about 900 MHz. In such an example, the present invention may be used to recover a plurality of digital cable television channels from a multichannel analog RF input signal which includes frequencies ranging from about 5 MHz to about 900 MHz.

Figure 2:
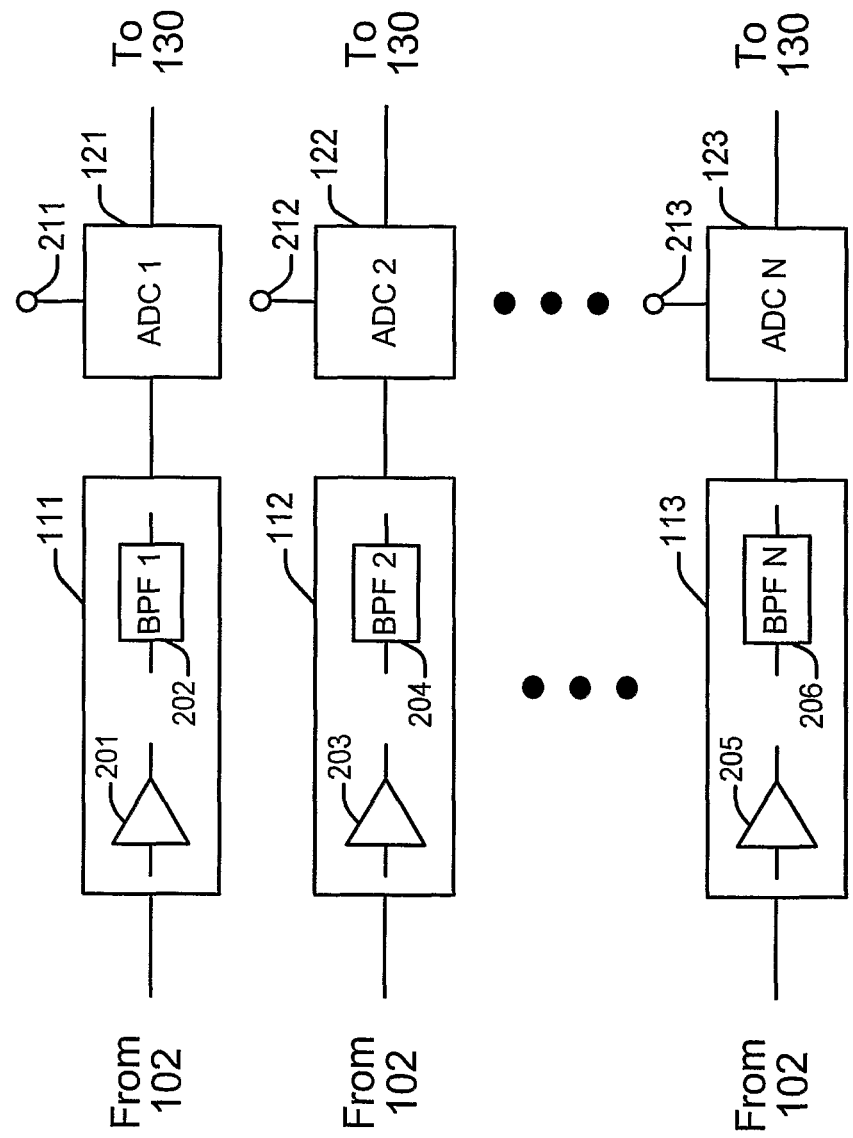
FIG. 2 is a simplified block diagram illustrating a portion of the exemplary multichannel receiver circuit shown in FIG. 1.

Referring now to FIG. 2, each amplifier-filter circuit 111, 112, 113 includes at least an amplifier 201, 203, 205 and a filter 202, 204, 206, respectively. Each of the amplifiers 201, 203, 205 may be a low-noise amplifier (LNA) or other amplifier suitable for use in analog RF front-end applications.

Each of the filters 202, 204, 206 may be band-pass filters (BPF) or other devices suitable for passing a range or band of frequencies while simultaneously filtering out or attenuating other frequencies outside the range or band. Each of the amplifier-filter circuits 111, 112, 113 may include one or more additional components (not shown) for accomplishing segregation of the analog input signal as described above.

In addition, each of the filters 202, 204, 206 may include a gain controlled amplifier. In an exemplary embodiment, each of the filters 202, 204, 206 includes a gain control input that allows adjustment of the respective gain of the filter. The system may thus be configured to allow adjustment of the filters to correspond to a range of possible received signal levels from the system while maintaining desirable signal levels at the inputs of the A/D converters. In one embodiment of the invention, a device is provided for comparing an output of the filter to a set-point value and controlling filter gain in a feedback loop.

Each amplifier-filter circuit 111, 112, 113 should preferably be physically separate and may be configured to amplify a particular range of frequencies without producing substantial intermodulation distortion effects. Alternatively, the amplifier-filter circuits 111, 112, 113 may be co-located in a single package configured to permit processing of signals within each band separately and independently (e.g., substantially free of intermodulation distortion attributable to simultaneous amplification of a wide range of frequencies). The amplifier-filter circuits 111, 112, 113 should preferably be configured to minimize degradation of one or more signal characteristics particularly susceptible to front end effects, such as noise figure, sensitivity, and dynamic range.

By employing undersampling techniques, various embodiments of the present invention may be economically implemented. As would be understood by one of ordinary skill in the art, the Nyquist criterion is met as long as the bandwidth of a signal is less than half of the sampling frequency. In one embodiment of the invention, each band has a bandwidth of about 300 MHz. Accordingly, each of the A/D converters 121, 122, 123 can recover a respective target frequency if operated at a sampling frequency of 600 MHz. In addition, since each of the bands has substantially the same bandwidth, a single 600 MHz clock is sufficient to provide a clock frequency for all of the analog-to-digital converters. Consequently, in one embodiment, a single clock device can provide the requisite clock signal for all of the A/D converters. Moreover, the required frequency is not remarkably high, facilitating design and implementation of the clock device.

Without the use of undersampling the system would require, for example, a first analog-to-digital converter 121 operating with a sampling frequency of about 600 MHz for processing frequencies in a band from about 5 MHz to about 300 MHz, a second analog-to-digital converter 122 operating with a sampling frequency of about 1.2 GHz for processing frequencies in a band between about 300 MHz and about 600 MHz, a third analog-to-digital converter 123 operating with a sampling frequency of about 1.8 GHz, for processing frequencies in a band from about 600 MHz to about 900 MHz, etc.

In accordance with an aspect of the invention, each analog-to-digital converter 121, 122, 123 may include a frequency selector 211, 212, 213 for setting the sampling frequency and/or input frequency corresponding to the desired band. For example, a first analog-to-digital converter 121 may include a first frequency selector 211 including a clock input coupler on which a clock signal is transmitted, indicating the desired sampling frequency of the first analog-to-digital converter 121. Other forms of communicating a desired sampling frequency of each of the analog-to-digital converters 121, 122, 123 may be utilized in accordance with the present invention, as would be appreciated by one of ordinary skill in the art.

Each analog-to-digital converter 121, 122, 123 should have resolution and linearity characteristics sufficient for satisfactorily processing digital television signals and associated signals intended for end users in a conventional cable television broadcast system. For example, each analog-to-digital converter 121, 122, 123 may produce from about 1024 to about 65536 discrete values, corresponding to a resolution of 10 (i.e., $2^{10}$=1024) to 16 (i.e., $2^{16}$=65536) bits.

Figure 3:
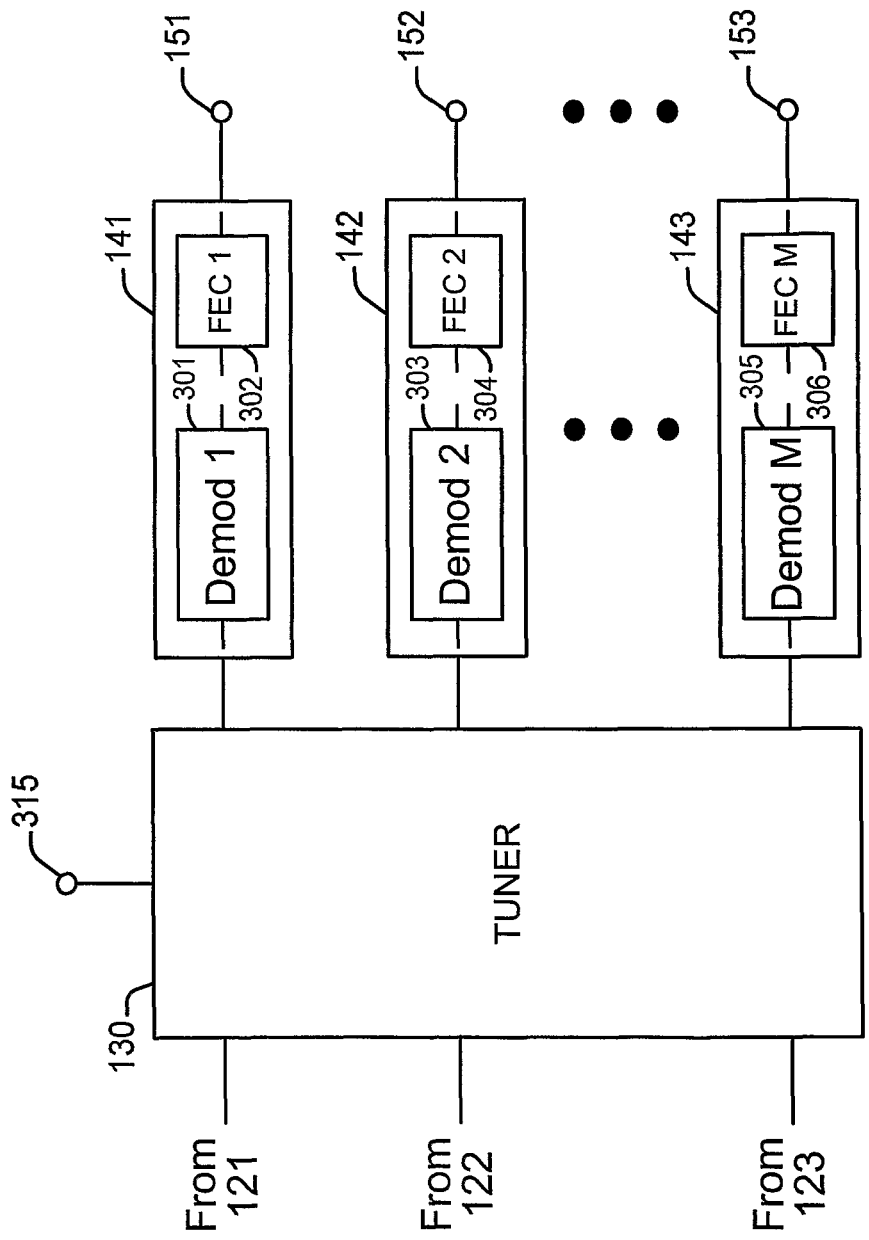
FIG. 3 is a simplified block diagram illustrating another portion of the exemplary multichannel receiver circuit shown in FIG. 1.

Referring now to FIG. 3, a digital tuner 130 is provided for processing the digital signals converted by the plurality of analog-to-digital converters 121, 122, 123. The digital tuner 130 may include one or more digital multiplexers or demultiplexers capable of generating a plurality of digital channel signals from the converted digital band signals. The digital tuner 130 may include a multitude of components configured as is well known in the art to recover a plurality of digital channel signals substantially simultaneously using a plurality of separate digital processors or a single digital processor.

The digital tuner 130 may include a channel selector 315 to permit selection of one or more particular digital channels desired to be recovered. For example, a selected set of digital cable television channels may be communicated to the digital tuner 130 via the channel selector 315 corresponding to a plurality of pay-per-view selections desired by members of a household; the digital tuner 130 may demultiplex only the digital channel signals corresponding to those digital cable television channels. Alternatively, the digital tuner 130 may be configured to demultiplex and recover all of the available digital channel signals.

It should be appreciated that the digital tuner 130 in accordance with the present invention is not limited to the above-described operations, but the digital tuner 130 may also perform a variety of other processing operations prior to providing digital channel signals suitable for use in each of the demodulation circuits 141, 142, 143. For example, the digital tuner 130 may perform coding, decoding, scrambling, descrambling, rotating, and/or derotating operations prior to passing the digital channel signals to demodulation circuits 141, 142, 143.

Each of the demodulation circuits 141, 142, 143 may include one or more demodulators 301, 303, 305 and forward-error-correction (FEC) circuitry 302, 304, 306, respectively. Each of the demodulation circuits 141, 142, 143 may include demodulators 301, 303, 305 configured to perform a particular demodulation function or set of functions corresponding to the type of digital content expected to be found within a corresponding digital channel signal. For example, a first demodulator 301 may be configured to perform quadrature amplitude modulation (QAM) demodulation of digital cable television signals; a second demodulator 303 may be configured to perform quadrature phase shift keying (QPSK) demodulation of digital audio signals; and a third demodulator 305 may be configured to perform vestigial sideband (VSB) demodulation of high-definition television (HDTV) signals. Of course, it should be appreciated that more than one of the plurality of demodulation circuits 141, 142, 143 may be configured to perform similar or identical functions or operations on separate digital channel signals substantially simultaneously.

Forward-error-correction (FEC) circuits 302, 304, 306 may include one or more components configured for coding or decoding, for example a Reed-Solomon decoder. It should be appreciated that each of the demodulation circuits 141, 142, 143 and/or the digital tuner 130 may include circuitry for providing additional functions, for example adaptive filters for removing multi-path propagation effects, co-channel interference, and other types of radio frequency interference (RFI) well known in the art.

Figure 4:
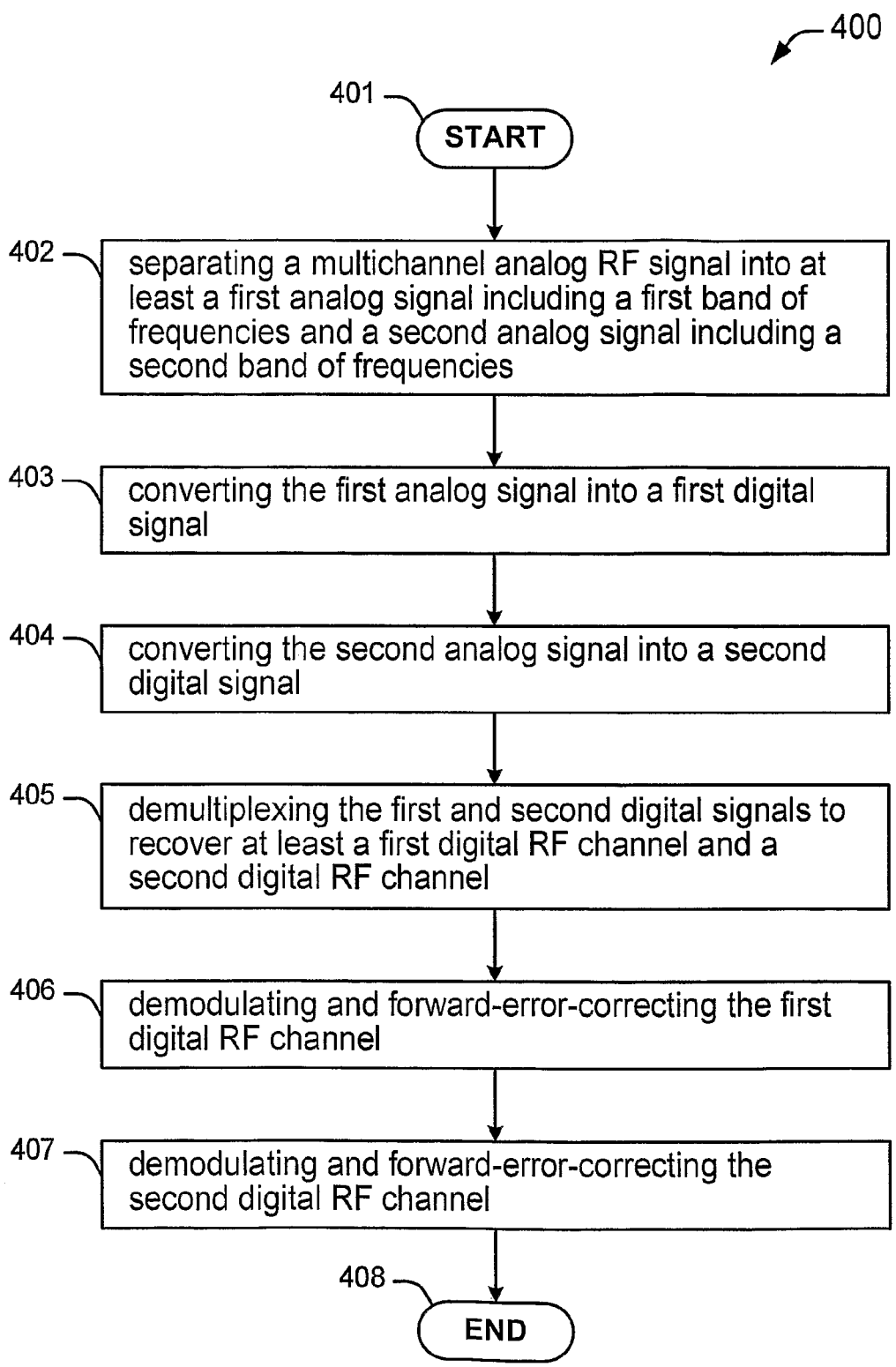
FIG. 4 is a flow diagram illustrating an exemplary method of receiving a plurality of digital RF channels in accordance with an alternate embodiment of the present invention.

FIG. 4 shows a flow diagram representation of a method of receiving a plurality of digital RF channels generally designated 400 in accordance with an aspect of the present invention. The method 400 includes a separating step 402, a first converting step 403, a second converting step 404, a demultiplexing step 405, a first demodulating step 406, and a second demodulating step 407.

The method 400 begins at step 401 and proceeds to step 402 in which a multichannel analog RF input signal is separated into a plurality of analog signals including at least first and second analog signals. The first analog signal includes a first band of frequencies and the second analog signal includes a second band of frequencies. It should be appreciated that the input signal may also be separated into at least a third analog signal including a third band of frequencies, and the first, second, and third bands of frequencies may not necessarily be contiguous.

In step 403, the first analog signal is converted into a first digital signal using a first analog-to-digital converter. In step 404, the second analog signal is converted into a second digital signal using a second analog-to-digital converter independently of the conversion performed in the first analog-to-digital converter. The first and second analog-to-digital converters may convert different frequency bands from analog to digital form, similar to analog-to-digital converters 121, 122, 123 described above with reference to FIGS. 1 and 2, and each should have a sampling frequency of at least twice the bandwidth of the respective frequency band in accordance with the Shannon-Nyquist sampling theorem. The first and second analog-to-digital converters should perform such conversions with resolution and linearity characteristics sufficient for satisfactorily processing digital television signals and associated signals intended for end users in a conventional cable television broadcast system.

In step 405, the first digital signal (converted in the first analog-to-digital converter) and the second digital signal (converted in the second analog-to-digital converter) are demultiplexed to generate a plurality of digital RF channel signals including at least first and second digital RF channel signals. Each of the plurality of digital RF channel signals is typically characterized by a different carrier frequency and a bandwidth or range of frequencies assigned to a particular application or type of content to be carried on that channel. It should be apparent that each digital RF channel signal may in turn carry or provide a plurality of data streams, e.g., audio, video, program information, or interactive content.

In step 406, the first digital RF channel signal is demodulated and forward-error-corrected. In step 407, the second digital RF channel signal is demodulated and forward-error-corrected. Steps 406 and 407 may be accomplished using demodulation circuits 141, 142, 143 described above with reference to FIGS. 1 and 3. However, the present invention is not so limited and steps 406 and 407 may alternatively be accomplished in any of several other ways known in the art, for example demodulation and forward-error correction steps 406 and 407 may be performed within one or more digital processors temporarily or semi-permanently programmed to perform such operations.

The method then proceeds to step 407, where it ends until another multichannel analog RF input signal is received from which one or more digital RF channels are desired to be recovered.

As illustrated in the preceding discussion and accompanying figures, the method and apparatus of the present invention represent an improvement in the state of the art for multichannel digital cable receivers and associated methods. The present invention provides a multichannel receiver circuit and method that accomplishes substantially simultaneous reception of a plurality of digital cable television channels at a reasonable cost. These advantages can be embodied in a single digital receiver circuit capable of recovering a wide variety of digital content, and may be configured for use with conventional cable television delivery systems.

One of skill in the art will appreciate that the invention, as described above, allows a single device to receive a modulated signal at an input and produce a plurality of video signals, or other information signals, related to the modulated signal. This plurality of video signals may then be received at respective devices such as, for example, a television display device, a PVR device, a videocassette recorder device, or any other appropriate signal receiving device. These devices may be disposed at respective locations which may or may not be remote from one another. Accordingly, for example, a plurality of television receivers, PVR's, or other devices, may be disposed in respective rooms of a house or multi-unit dwelling, in a respective plurality of offices, or in otherwise separated locations while concurrently receiving signals from a common modulated signal input.

While the invention has been described in detail in connection with the preferred embodiments known at the time, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. An apparatus comprising:
an input point operative to receive a multichannel analog RF signal;
a demultiplexer including a plurality of amplifier-and-filter banks coupled to said input point operative to provide a plurality of RF signals from said multichannel analog RF input signal in respective ones of bands of frequencies, said bands of frequencies including an upper band of frequencies and a lower band of frequencies, said upper band of frequencies and said lower band of frequencies being adjacent in a frequency domain;
a plurality of analog-to-digital converters coupled to said demultiplexer operative to digitize respective ones of said plurality of RF signals;
a digital tuner coupled to said plurality of analog-to-digital converters operative to provide a plurality of digital television channel content signals from said plurality of digitized RF signals, said digital tuner having a channel selector input; and
a plurality of demodulators coupled to said digital tuner operative to demodulate said plurality of digital television channel content signals simultaneously and separately, wherein
said digital tuner selects a particular number of said plurality of digital television channel content signals as a subset of the number of said plurality of digitized RF signals in response to information on a set of channels selected by a user; said information is communicated to said channel selector input;

an RF signal in the vicinity of a band edge between said upper band of frequencies and said lower band of frequencies in said frequency domain is processed by each one of two of said plurality of amplifier-and-filter banks independently as a signal in each one of said upper band of frequencies and said lower band of frequencies;

said upper band of frequencies encompasses from 300 MHz to 600 MHz;

said lower band frequencies encompasses from 5 MHz to 300 MHz; and said band edge is 300 MHz.

2. The apparatus of claim 1, wherein
said set of channels selected by user include pay-per-view channels.

3. A method comprising the steps of:
receiving a multichannel analog RF signal;
providing a plurality of RF signals, using a demultiplexer including a plurality of amplifier and filter banks, from said multichannel analog RF input signal in respective ones of bands of frequencies, said bands of frequencies including an upper band of frequencies and a lower band of frequencies, said upper band of frequencies and said lower band of frequencies being adjacent in a frequency domain;

digitizing respective ones of said plurality of RF signals, using a plurality of analog-to-digital converters;

providing a plurality of digital television channel content signals from said plurality of digitized RF signals; and demodulating said plurality of digital television channel content signals simultaneously and separately, wherein said providing a plurality of digital television channel content signal step includes selecting a particular number of said plurality of digital television channel content signals as a subset of the number of said plurality of digitized RF signals in response to information on a set of channels selected by a user; said information is communicated to said channel selector input;

an RF signal in the vicinity of a band edge between said upper band of frequencies and said lower band of frequencies in said frequency domain is processed, using two of said amplifier and filter banks, independently as a signal in each one of said upper band of frequencies and said lower band of frequencies;

said upper band of frequencies encompasses from 300 MHz to 600 MHz;

said lower band frequencies encompasses from 5 MHz to 300MHz; and said band edge is 300 MHz.

4. The method of claim 3, wherein
said set of channels selected by user include pay-per-view channels.

* * * * *